United States Patent
Lazarus et al.

(10) Patent No.: US 6,816,512 B2
(45) Date of Patent: Nov. 9, 2004

(54) ARRANGEMENT FOR MANAGING MULTIPLE TELEPHONE LINES TERMINATING AT A SINGLE LOCATION

(75) Inventors: David B. Lazarus, Elkins Park, PA (US); Yucheng Jin, Chalfont, PA (US); James D. Rosemary, Claymont, DE (US); Matthew G. Waight, Pipersville, PA (US); Kevin T. Chang, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 769 days.

(21) Appl. No.: 09/752,893

(22) Filed: Dec. 29, 2000

(65) Prior Publication Data

US 2001/0033585 A1 Oct. 25, 2001

Related U.S. Application Data

(60) Provisional application No. 60/173,887, filed on Dec. 30, 1999.

(51) Int. Cl.$^7$ .................................................. H04J 3/04
(52) U.S. Cl. ......................... 370/535; 370/356; 398/98
(58) Field of Search ................................. 370/442, 443, 370/458, 352, 356, 535; 398/45, 46, 58, 66, 74, 76, 98

(56) References Cited

U.S. PATENT DOCUMENTS

| | | | | |
|---|---|---|---|---|
| 5,729,370 A | * | 3/1998 | Bernstein et al. | ............. 398/66 |
| 5,850,400 A | * | 12/1998 | Eames et al. | ............... 370/443 |
| 5,917,624 A | * | 6/1999 | Wagner | ....................... 398/71 |
| 5,920,571 A | * | 7/1999 | Houck et al. | ............... 370/458 |
| 6,073,266 A | * | 6/2000 | Ahmed et al. | .............. 714/749 |
| 6,357,044 B1 | * | 3/2002 | Sevenhans et al. | ......... 725/129 |
| 6,389,004 B1 | * | 5/2002 | Fantin | ........................ 370/351 |
| 6,452,923 B1 | * | 9/2002 | Gerszberg et al. | ......... 370/352 |
| 6,621,789 B1 | * | 9/2003 | Missett | ....................... 370/225 |

FOREIGN PATENT DOCUMENTS

WO      WO062522      10/2000

OTHER PUBLICATIONS

Vander Keere V et al.: "Rapid prototyping of a CATV network termination for ATM–based video–on–demand services", Rapid System Protyping, 1996, pp. 44–49.
Sierens C et al.: "Realization of an ATM–based HFC demonstrator with high upstream capacity", Global Telecommunications Conference, 1997, pp. 448–452.

* cited by examiner

*Primary Examiner*—Bob A. Phunkulh
(74) *Attorney, Agent, or Firm*—Volpe and Koenig, P.C.

(57) ABSTRACT

An arrangement for controlling multiple telephone lines terminating in a single residence uses a multiplexer within a communications gateway and a plurality of demultiplexers, each demultiplexer coupled to a separate one of telephone lines. The communications gateway functions to convert all received analog telephony signals into a digital format and then multiplexes the digital signals onto a single telephone line connected to the residence. The various telephone lines in the residence are connected in series along the line, using a number of drop-off points. The demultiplexer on each telephone line is configured to recognize the time slots within the multiplexed signal destined for its associated telecommunications device. In a similar fashion, separate time slots are assigned for upstream transmission from each telecommunication device into the HFC network.

10 Claims, 5 Drawing Sheets

ARRANGEMENT FOR MANAGING MULTIPLE TELEPHONE LINES TERMINATING AT A SINGLE LOCATION

CROSS-REFERENCE TO RELATED APPLICATIONS

This application claims the priority of Provisional Application No. 60/173,887, filed Dec. 30, 1999.

TECHNICAL FIELD

The present invention relates to an arrangement for managing multiple telephone lines terminating at a single location and, more particularly, to a multiplexing/demultiplexing scheme useful with digital data to control the management of the multiple telephone lines.

BACKGROUND OF THE INVENTION

Hybrid fiber coaxial (HFC) networks are rapidly evolving to support a variety of telecommunications services in addition to traditional broadcast-type video services. In particular, HFC networks are being utilized to provide data services, including high speed Internet access. Cable network operators are expected to be providing medium- to high-penetration rate telephony services in the near future.

Telecommunications services, such as plain old telephone service (POTS), can be provided through the use of a unit located on the side of a home, or in a centralized location in the residence (or business). This unit, which forms the interface between the HFC network and the telephone-based customer premise equipment (CPE) is often referred to in the art as a "communications gateway", or CG. The CG contains various line cards that provide an interface between the HFC network and the traditional telephones, for example, using a "POTS card" located in the CG. The CG transmits and receives data over the HFC network using a particular protocol, which in a preferred embodiment is the Data Over Cable Service Interface Specification (DOCSIS), using the Media Gateway Control Protocol (MGCP) as the signaling protocol for telephony applications.

With a POTS card in place, an interface to a twisted-wire pair is provided and telephones in the residence can be used in a conventional manner, with all of the phones connected to a single twisted-wire pair connected in a bus configuration to the phone outlets throughout the building. Alternatively, "home run" wiring may be utilized, with point-to-point connections being established between a centralized location and a particular telephone outlet or set of outlets. The advantage of home run wiring is that several phone lines can easily be supported in the home, and phones in one area can be assigned one telephone number, distinct from other numbers used for phones in other areas. Multiple POTS cards are typically used to support multiple telephone lines.

There are occasions in which a customer has multiple phone lines and in-home wiring which is in a point-to-point ("home run") configuration. The customer may not want to have individual and distinct phone lines, but may want the lines grouped together. It would be advantageous to perform this grouping without requiring the house to be rewired, either by the owner or a telecommunications service company employee. On the other hand, for homes that do not have home run wiring, but utilize the simple bus structure (which connects to the telecommunications network at a single point of demarcation), a customer may desire to have additional lines supplied by the HFC network operator. This necessitates other arrangements for providing multiple telephone line services into the home.

Thus, a need remains in the prior art for a relatively simple arrangement for implementing multiple telephone lines in a single residence that allows for dynamic reconfiguration of the in-home arrangement of the telephone lines

SUMMARY OF THE INVENTION

The need remaining in the prior art is addressed by the present invention, which relates to an arrangement for managing multiple telephone lines terminating at a single location and, more particularly, to a multiplexing/demultiplexing scheme useful with digital data to control the management of the multiple telephone lines.

In accordance with the present invention, a multiplexing element (referred to as a "digital phone line eliminator") is embedded within a communications gateway and is used to multiplex a plurality of separate incoming telephone lines onto a single line into the residence. A plurality of demultiplexers (referred to as "telephone adaptors") are coupled to separate ones of the telephones in the residence and used to capture the telephone signal destined for that particular phone line. In a preferred arrangement, an exemplary multiplexed frame, defined by the communications gateway, includes an initial sync pulse as the preamble portion of each frame, followed by a plurality of separate time slots associated with each telephone device. Preferably, an "upstream" and a "downstream" time slot is associated with each device. As devices are added to or dropped from the in-home network, the time slot assignments are modified by the communications gateway. If less than the full number of lines are utilized within the home, more than one time slot will be associated with a particular device.

Various other features, particularly the ringing sequence, can thus be controlled for each device in particular, as will be described in detail below and with reference to the accompanying drawings.

BRIEF DESCRIPTION OF THE DRAWINGS

Referring now to the drawings

DETAILED DESCRIPTION

Figure 1:
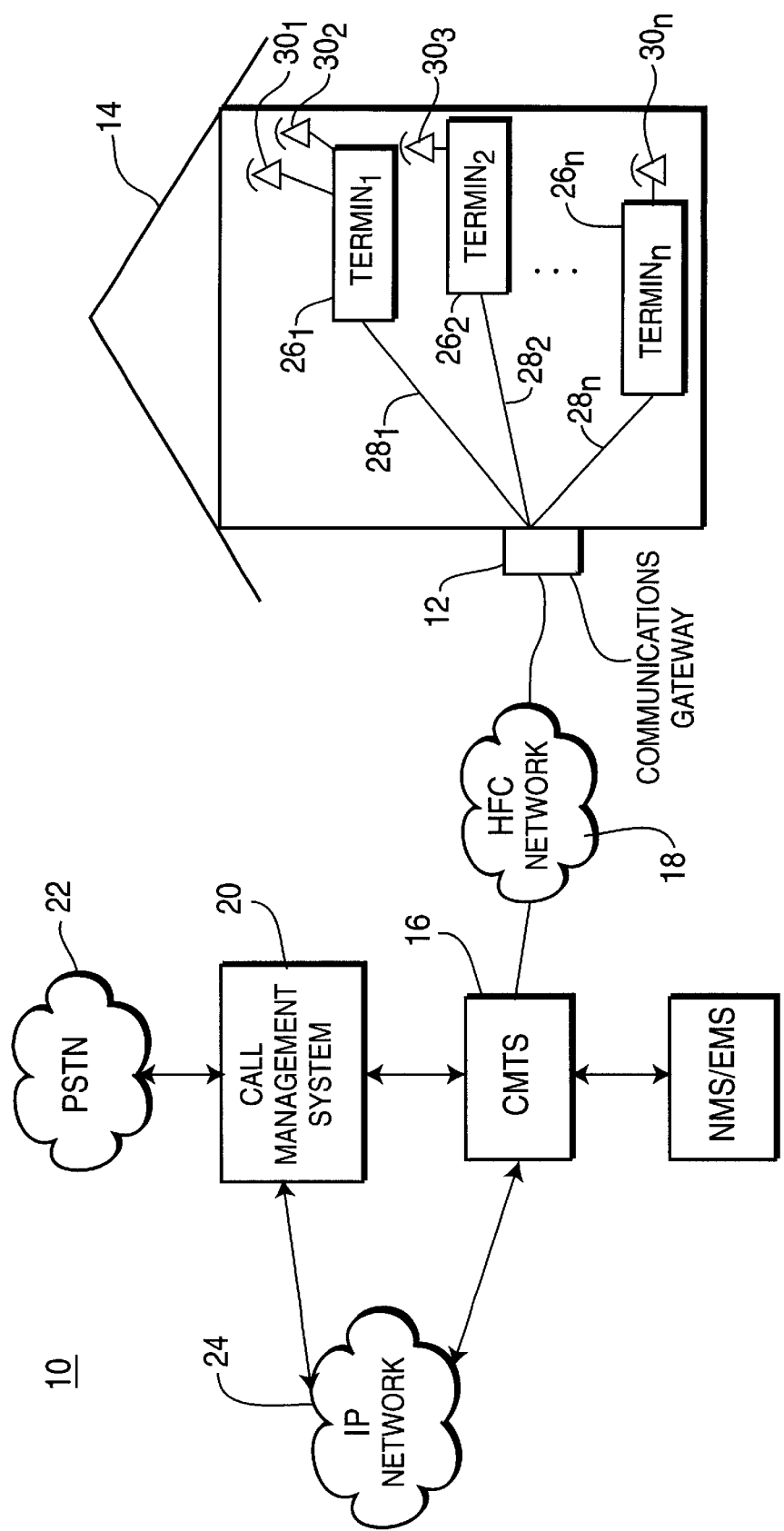
FIG. 1 illustrates a simplified portion of an exemplary HFC network that is capable of utilizing the line multiplexing arrangement of the present invention.

FIG. 1 contains a diagram of a simplified portion of an exemplary prior art communication system 10 that can support the delivery of telephony services to a home. The service is based on the use of a communications gateway (CG) 12 located at or near a residence 14. CG 12 is in communication with a Cable Modem Termination System (CMTS) 16 via an HFC network 18. CMTS 16 is also in communication with a Call Management System (CMS) 20 that can communicate with both a public switched telephone network (PSTN) 22 and an IP network 24. As shown in FIG.

1, CG 12 includes multiple terminations $26_1, 26_2, \ldots, 26_N$ within residence 14, each termination coupled to separate telephone line $28_1, 28_2, \ldots, 28_N$ connected to various, separate telephone devices $30_1, 30_2, \ldots, 30_N$. In the prior art, any attempt to re-configure the in-home network of devices and telephone lines requires additional terminations and lines to be added to CG 12. As mentioned above, the reconfiguration necessitates re-wiring to be done by either the subscriber or a telecommunications employee.

Figure 2:
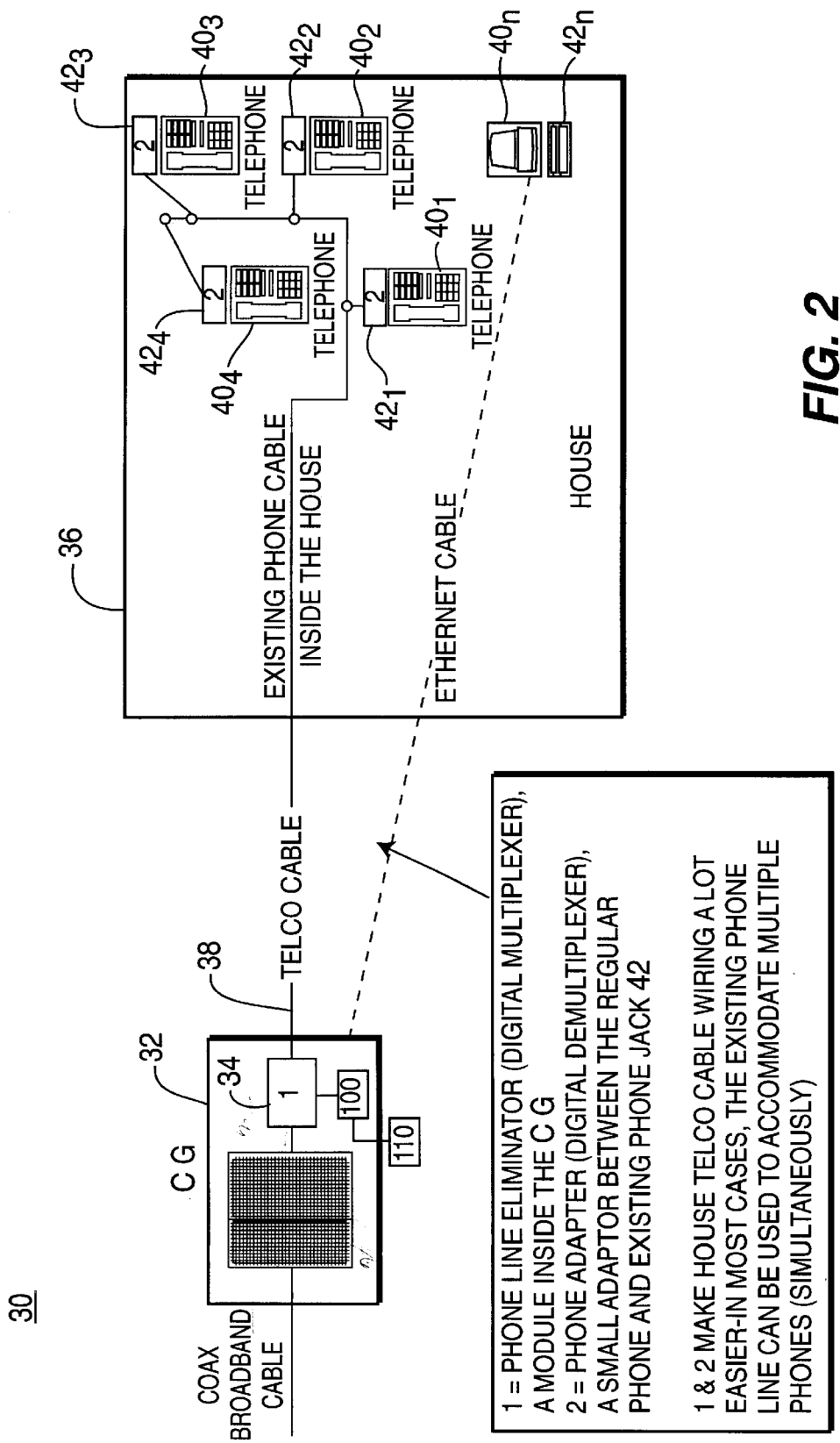
FIG. 2 depicts an exemplary phone line eliminator (within a communications gateway) and plurality of telephone adaptors (and associated telephone devices) as deployed in accordance with the present invention.

In accordance with the present invention, this requirement is eliminated by including a multiplexing/demultiplexing ("mux/demux") arrangement within the in-home network. FIG. 2 illustrates an exemplary mux/demux architecture 30 for implementing the present invention. As shown, a communications gateway (CG) 32 is modified to incorporate a multiplexer 34, where multiplexer 34 receives multiple downstream digital telecommunication signals destined for different telephone lines within a residence 36 and multiplexes the separate digital signals onto a single telephone line 38. A plurality of separate telephone devices, denoted $40_1$–$40_4$, are shown in FIG. 2 as located within residence 36 (in general, any desired number of devices (N) can be accommodated with the mux/demux arrangement of the present invention). Associated with each device 40 is a separate demultiplexer $42_1$–$42_4$, as shown, where each demultiplexer is programmed to recognize the particular incoming digital telephone signal destined for its associated telephone device 40, Demultiplexer 42 can operate from either a wall-mounted AC adaptor or, alternatively, can draw power from the telecommunications network.

For the arrangement illustrated in FIG. 2, therefore, a set of four separate telephone signals (i.e., four separate telephone numbers) can be received within residence 36 using only a single incoming telephone line 38. As shown, the set of four demultiplexers $42_1$–$42_4$ are disposed in series along telephone line 38, with a separate endpoint $44_1$–$44_4$ used to attach each demultiplexer 42 to telephone line 38. Changes in the number and/or location of the multiple endpoints can easily be modified, in accordance with the present invention, by altering the multiplexing/demultiplexing scheme, as will be discussed below.

Figure 3:
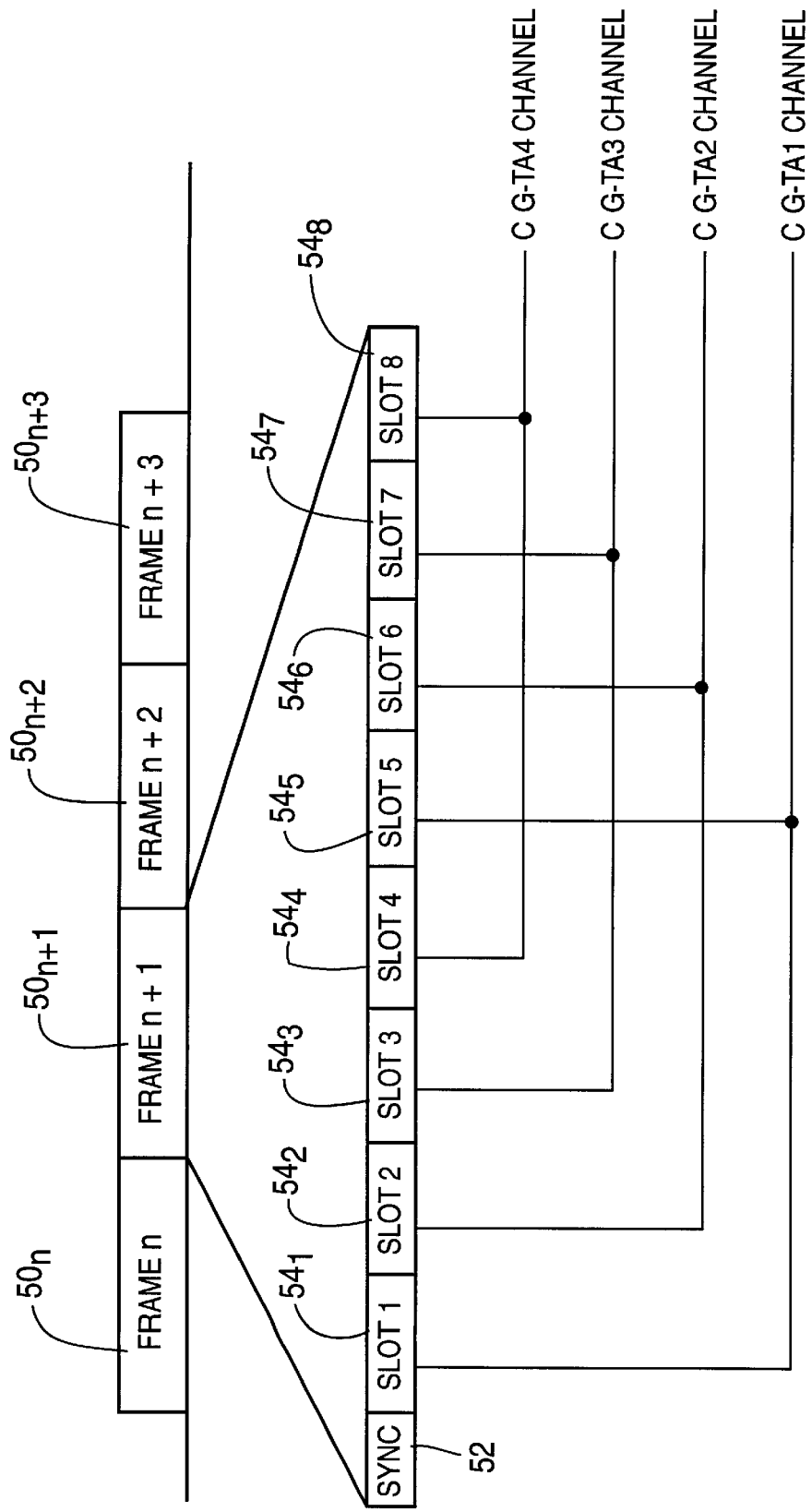
FIG. 3 contains an exemplary time frame, defining time slot locations within the frame.

In particular, FIG. 3 contains an illustration of an exemplary multiplexing scheme that may be used by multiplexer 34 within CG 32 to generate the multiplexed digital telecommunications traffic of the present invention. As shown, the multiplexed signal is defined as consisting of a number of frames, generated in a time sequence. An exemplary frame SO is further depicted as comprising an initial synchronization symbol 52 and a plurality of time slots $54_1$–$54_8$ which follow sync symbol 52 in sequence. Sync symbol 52 is generated by multiplexer 34 and is used to define the beginning of each frame, allowing for the plurality of demultiplexers 42 to remain in synchronization with the digital line and "pick off" the telephone signal destined for its associated device 40. In the particular arrangement of FIG. 3, time slots $54_1$–$54_4$ are defined as the "receive" time slots for demultiplexers $42_1$–$42_4$. Time slots $54_5$–$54_8$ are used for upstream transmission by the set of devices 40 back into the telecommunications network. For example, time slot $54_5$ is reserved for an upstream digital signal from device $40_1$, time slot $54_6$ is reserved for device $40_2$, time slot $56_7$ is reserved for device $40_3$, and time slot $56_8$ is reserved for device $40_4$. Obviously, other arrangements of time slot designations can be used. For example, time slots $54_1$ and $54_2$ can be associated with device $40_1$, time slots $54_3$ and $54_4$ with device $40_2$, etc.

Each demultiplexer 42, therefore, is assigned particular time slots for reception and transmission of voice signals. That is, based on recognizing the synchronization symbol, and knowing the "distance" between the sync symbol and the assigned time slots, each demultiplexer can "pick off" only that information destined for its coupled device 40.

Logical merging of telephone endpoints 44 can be used when a house is wired to use all of the available telephone numbers supported by a communications gate 32 (in the above example, four such lines are available). In accordance with the present invention, the logical merging allows for combinations of the different telephone terminations without any rewiring. Telecommunication service providers can thus use the inventive mux/demux arrangement to provide multiple tiers of services and prices by remotely combining/ separating different telephone line terminations For example, all four telephone terminations can be combined into one line simply by designating each "downstream" time slot as associated with the same telephone number and each "upstream" time slot as emanating from the same telephone number. Such an alteration can easily be accomplished by the CG re-programming the time slot assignments within its multiplexer.

In a preferred embodiment, the Simple Network Management Protocol (SNMP) is used to configure the CG to logically combine two or more of the separate telephone number terminations. For example, element managers or back-office type programs can perform, on a dynamic basis, the configuration and re-configuration of the time slot assignments. Alternatively, a Web-based interface or software-defined network (SDN) type of interface may be utilized by the subscriber to modify the configuration from the residence side of the network. In one particular arrangement, each physical telephone endpoint and drop-off line to the demultiplexer is provided with a logical endpoint identifier, and SNMP Management Information Bases (MIBs) are used to define the logical endpoint identifier for each telephone line. The phone lines can then be combined by defining the same logical endpoint identifier for each separate physical device, Accordingly, telephone numbers can correspond to the logical endpoint IDs and ringing is performed on the logical endpoint, causing all phone lines associated with the logical endpoint to ring.

Figure 4:
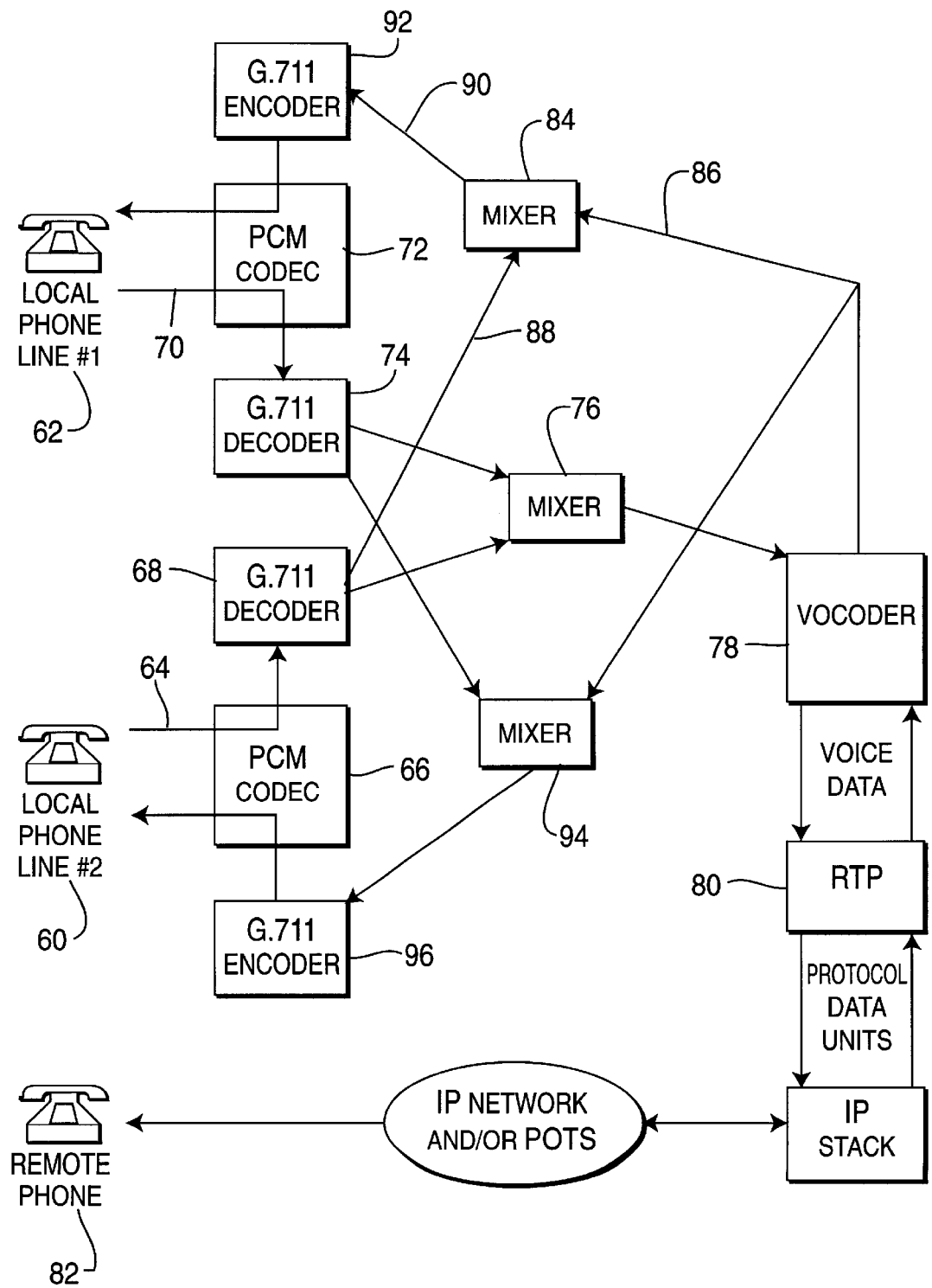
FIG. 4 illustrates an arrangement for combining an "unusable" telephone line within a residence with another telephone line coupled to the telecommunications network.

In accordance with a particular aspect of the present invention, an "unusable" telephone line can be merged into an operational line using, for example, the configuration illustrated in FIG. 4. This configuration is particularly well-suited for the situations where the communications gateway cannot support the number of separate telephone lines as wired within the residence. As an example, if three-way calling uses two voice coders (vocoders) within the CG and no additional vocoder is present, the four separate telephone calls cannot be supported by the CG. This results in telephones which can neither give a dial tone nor be connected to the network (i.e., "unusable"). FIG. 4 illustrates a particular arrangement where an "unusable" telephone line 60 can be merged with an operational line 62 to allow for telephone communications to be established with both phones. As shown, upstream communication along path 64 from device 60 is converted into a digital voice signal by a PCM codec 66 using a logarithmic method such as the A-law or $\mu$-law G.711 voice coding algorithm. In the particular embodiment illustrated in FIG. 4, the 8-bit output from PCM codec 66 is the converted into a linear 16-bit PCM signal utilizing a G.711 decoder 68. Alternatively, the upstream voice signal may be directly digitized and converted into the linear 16-bit PCM signal. In a similar fashion, the upstream communication from device 62 is supplied to a line 70 and then digitized within a PCM codec 72. The 8-bit output from PCM codec 72 is thereafter applied as an input to a G.711 decoder 74 to generate the linear 16-bit PCM output signal. The linear 16-bit upstream signals from decoders 68 and 74 are then supplied as separate inputs to a mixer 76 which functions to combine the two streams into a single digitized upstream signal. The output from mixer 76 is thereafter applied as an input to vocoder 78 within the communications gateway, and the mixed signal is transported in a conventional fashion. Vocoder 78 is used to encode the upstream signal to the required voice coding standard, such as G.711, G.728 or G.727. In the particular embodiment illustrated in FIG. 4, the Real-time Transport Protocol (RTP) layer 80 is used to transport the voice signal to a remote device 82, where RTP layer 80 encapsulates the output of vocoder 78 into RTP packets. Thus, with this particular arrangement of the present invention, devices 60 and 62 are capable of sharing a single vocoder 78.

On the downstream path, voice data from remote device 82 is first converted into a linear 16-bit PCM signal by vocoder 78, In a preferred embodiment, vocoder 78 performs buffering and runs interpolation algorithms to remove the effects of network jitter and noise on the received signal. The digitized downstream voice data from vocoder 78 is then distributed to each of the "combined" devices (in this case, devices 60 and 62). As shown, a first mixer 84 combines the downstream digitized voice data along a first signal path 86 with the upstream voice signal coming from decoder 68 along a second signal path 88 and sends both signals along an output signal path 90 to a G.711 encoder 92. Encoder 92 processes the voice data signal output from first mixer 84 and PCM coder 72 is then used to convert the logarithmic 8-bit PCM output from encoder 92 into an analog signal for transmission to device 62, In a similar fashion, a second mixer 94 is responsive to both the downstream voice signal from vocoder 78 and the upstream output from decoder 74, sending both signals to a G.711 encoder 96 and thereafter through PCM codec 66 for transmission as analog signals to device 60.

The particular arrangement as shown in FIG. 4 is useful when combining two separate phone lines into one. In general, any number of separate phone lines can be so combined and indeed when combining all four lines (for the arrangement as depicted in the accompanying drawings) of the CG to appear as a single line, the downstream output of any given line would therefore be the mix of all of the other local lines with the incoming signal form the remote device.

Figure 5:
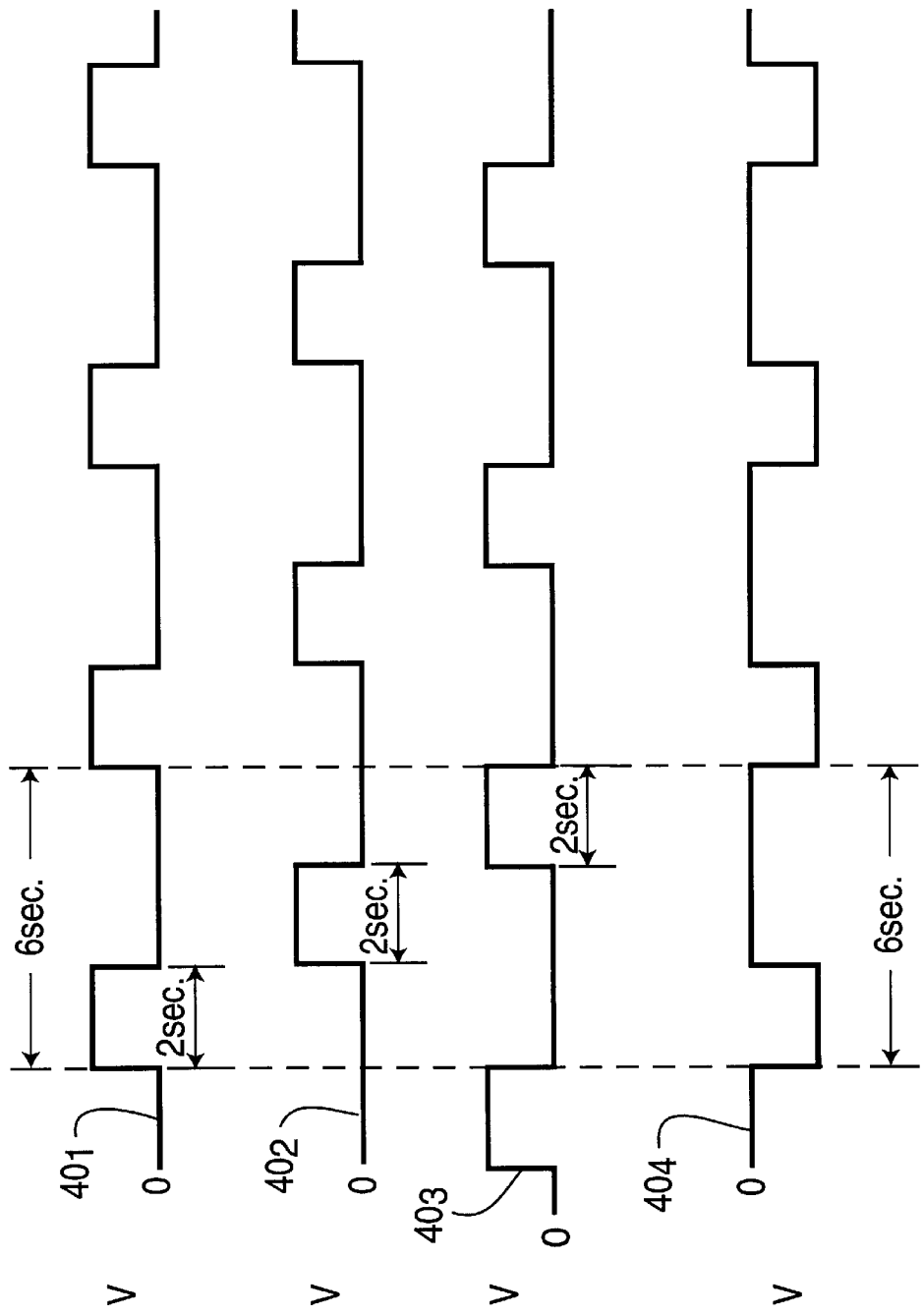
FIG. 5 contains a diagram illustrating the use of staggered ringing with multiple telephone lines in accordance with the present invention.

A staggered ringing pattern can be used in a multiple phone line arrangement of the present invention, where the staggered ringing will aid in reducing the network powering cost. That is, by staggering the ringing associated with the different lines, the peak power consumption will be reduced by ringing the phone lines at different phases of the ring timing. Without utilizing any staggering, the ringing current can reach 50 mA AC if all lines are rung at the same time. Staggering the ringing pattern allows for dropping the peak ringing current to a value equivalent to the ringing current of a single phone line. The timing diagram for an exemplary staggered ringing plan that may be used in accordance with the present invention is illustrated in FIG. 5. For example, for a 6-second ring cycle, the line associated with device $40_1$ is rung during the first two seconds, and is then "off" for the remaining four seconds. The remaining lines can subsequently be rung, in turn, on each subsequent two second slot. That is, the line associated with device $40_2$ is rung during the next two seconds and the line associated with device $40_3$ is rung during the final two seconds. In the cases where more than one phone line shares the same two second interval (such as for devices $40_1$ and $40_4$ in the current example), the 20 Hz ring signals are applied to the devices in an out of phase format, as shown, to reduce the loading on each supply rail to the devices. A processor 100 can be included within CG 32 to establish and control the staggered or otherwise scheduled ringing pattern, where the pattern may be modified by processor 100 as lines are added/dropped to the configuration, or under control of optional user input device 110, which may be, for example, a keypad.

As set out below in the following claims, it will be understood by those skilled in the art that the foregoing illustrations and discussion merely exemplify preferred embodiments of the present invention and that there are modifications and changes that may be made without departing from the spirit and scope thereof.

What is claimed is:

1. In a hybrid fiber coaxial (HFC) network, an arrangement for providing communication between one or more remote telecommunication devices and a plurality of N telecommunication devices in a single location, the arrangement comprising a communications gateway disposed at an interface between the HFC network and the single location, the communications gateway for receiving a plurality of incoming analog telecommunications signals and converting said signals into digital signals, said communications gateway comprising a multiplexer for combining the plurality of incoming digital telecommunication signals into a single output signal;

a plurality of N demultiplexers, each demultiplexer associated with a separate one of the plurality of N telecommunications devices, said plurality of N demultiplexers disposed along a single signal path and coupled at an end termination to the output from said communications gateway multiplexer.

2. The arrangement as defined in claim 1 wherein the multiplexer is configured to combine the plurality of N digital signals into a frame format comprising a plurality of separate time slots for each communications device of the plurality of N communication devices.

3. The arrangement as defined in claim 2 wherein each frame further comprises an initial synchronization symbol to control timing between and among the plurality of N telecommunication devices.

4. The arrangement as defined in claim 2 wherein each frame is configured to include a first set of N receiving time slots, each associated with a separate telecommunication device, for receiving downstream digital signal transmission from the HFC network and destined for various ones of the plurality of N telecommunication devices.

5. The arrangement as defined in claim 4 wherein each frame is further configured to include a second set of N transmitting time slots, each associated with a separate telecommunication device, for transmitting upstream digital signal transmission from its associated telecommunication device into the HFC network.

6. The arrangement as defined in claim 1 wherein the communications gateway further comprises a processor for generating a scheduled ringing pattern from the plurality of N telecommunications devices.

7. The arrangement as defined in claim 6 wherein the processor generates a ringing period of a predetermined time interval and assigns each telecommunication device a ringing sub-interval within the predetermined interval, wherein for any multiple devices assigned to ring during the same sub-interval, the processor generates out of phase ringing signals.

8. The arrangement as defined in claim 6 wherein the processor generates a six second ringing time interval with two second sub-intervals.

9. The arrangement as defined in claim 6 wherein said ringing pattern is a run time optimized scheduled pattern.

10. The arrangement as defined in claim 6 wherein said scheduled ringing pattern is user selected.

* * * * *